United States Patent [19]
Muryoi

[11] 3,868,714
[45] Feb. 25, 1975

[54] FILTER CHANGE-OVER DEVICE IN AN OBJECTIVE LENS FOR A SINGLE LENS REFLEX CAMERA

[75] Inventor: Takeshi Muryoi, Kawasaki, Japan
[73] Assignee: Nippon Kogaku, K.K., Tokyo, Japan
[22] Filed: Dec. 5, 1972
[21] Appl. No.: 312,344

[30] Foreign Application Priority Data
Dec. 17, 1971  Japan.............................. 46-119296

[52] U.S. Cl.................. 354/289, 350/315, 354/233
[51] Int. Cl. ........................................... G03b 11/00
[58] Field of Search................... 95/42, 11 U, 64 R; 350/315; 354/102, 270, 289, 233

[56] References Cited
UNITED STATES PATENTS

| | | | |
|---|---|---|---|
| 2,132,683 | 10/1938 | Harmen | 95/64 R |
| 2,684,611 | 7/1954 | Hinden | 350/315 X |
| 2,687,669 | 8/1954 | Bolsey | 350/315 X |
| 3,547,019 | 12/1970 | Matsubara | 95/11 U |
| 3,580,148 | 5/1971 | Harvey | 350/315 X |
| 3,661,458 | 5/1972 | Noemer et al. | 350/315 X |

Primary Examiner—Samuel S. Matthews
Assistant Examiner—E. M. O'Connor
Attorney, Agent, or Firm—Shapiro and Shapiro

[57] ABSTRACT

A filter change-over device in a single lens reflex camera having filter holder members adapted to position filters on the optical axis of the objective lens of the camera employs a light intercepting member which intercepts the optical path during filter change-over and the member is retracted only when filter change-over operation has been proper and complete. The light intercepting member is removed from the optical path only when one of the filters is positioned in its operable position transverse to the optical axis.

6 Claims, 2 Drawing Figures

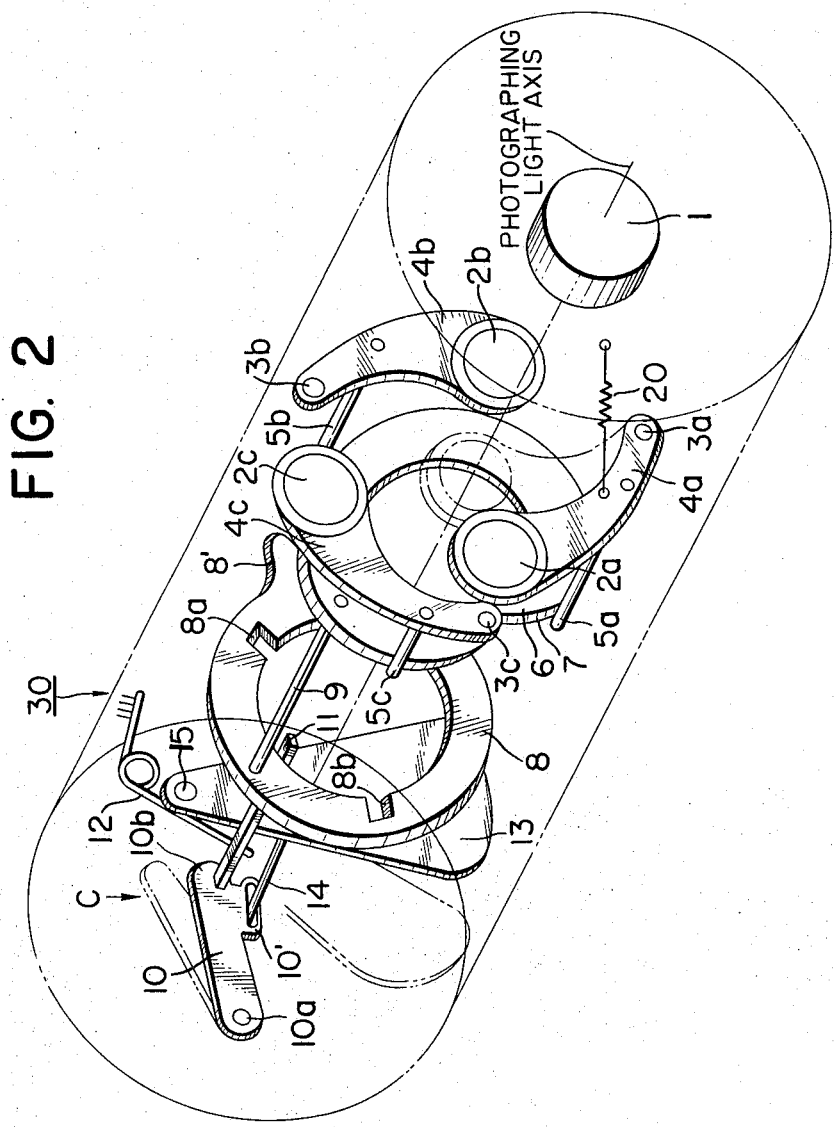

FILTER CHANGE-OVER DEVICE IN AN OBJECTIVE LENS FOR A SINGLE LENS REFLEX CAMERA

BACKGROUND OF THE INVENTION

1. Field of the Invention

This invention relates to a filter change-over device for a single lens reflex camera.

2. Description of the Prior Art

Single lens reflex cameras of the type in which various filters contained therein may be changed over from one to another to thereby adjust the quantity of light, or to provide an orthochromatic effect, are known. Filter change-over operation may not be momentarily completed. A filter may be stopped at an intermediate position during filter change-over, or a filter may inadvertently fail to be brought to proper change-over position. Such drawbacks are difficult to avoid both in the turret type of device and in the type wherein separate single filters are alternately advanced into the optical axis.

For example, if filter change-over is incomplete but with the filter holding frame projected into the picture-taking optical path, only a dim shadow appears on the focusing screen because the filter holding frame is located away from the focal plane of the lens system (i.e. the frame is incorporated in lens tube). Accordingly, one often fails to notice within the viewfinder that the filter holding frame is projected into the picture-taking optical path.

SUMMARY OF THE INVENTION

The present invention provides a filter change-over device in which a separate light intercepting member completely intercepts the optical path during the course of filter change-over operation to make the interior of the viewfinder pitch-black, and the light intercepting member is retracted from the optical path to permit focusing and photographing only when a filter is in its proper position. As a result, the photographer is forewarned should the filter change-over operation be incomplete or improper.

The filter change-over device of the invention is provided in a tube for an objective lens and comprises filter members adapted to be positioned on the optical axis of the objective lens. Filter change-over means are provided for setting the filter members to a predetermined position on the optical axis. A light intercepting member acts to intercept the optical path, and means is provided to retract the light intercepting member only when the filter members are set to proper predetermined position.

Each of the filter members is movable between a first position lying in the optical path of the objective lens and a second position lying outside of the optical path. The light intercepting means is movable between a position for intercepting the optical path of the objective lens and a position outside the optical path. The filter members and their filters and the light means may be operatively associated with each other so that the intercepting means is in the non-intercepting position when a selected filter or filters are in the first or optical path position and the intercepting means is in the light intercepting position when the filters are in the second position thereof.

The foregoing and other advantages and improved results furnished by the filter change-over device of the invention will be apparent from the following detailed description of an embodiment thereof, taken in conjunction with the accompanying drawings.

BRIEF DESCRIPTION OF THE DRAWINGS

FIG. 2 is a view similar fo FIG. 1 but showing the device during the course of filter change-over operation.

DESCRIPTION OF THE PREFERRED EMBODIMENTS

Figure 1:
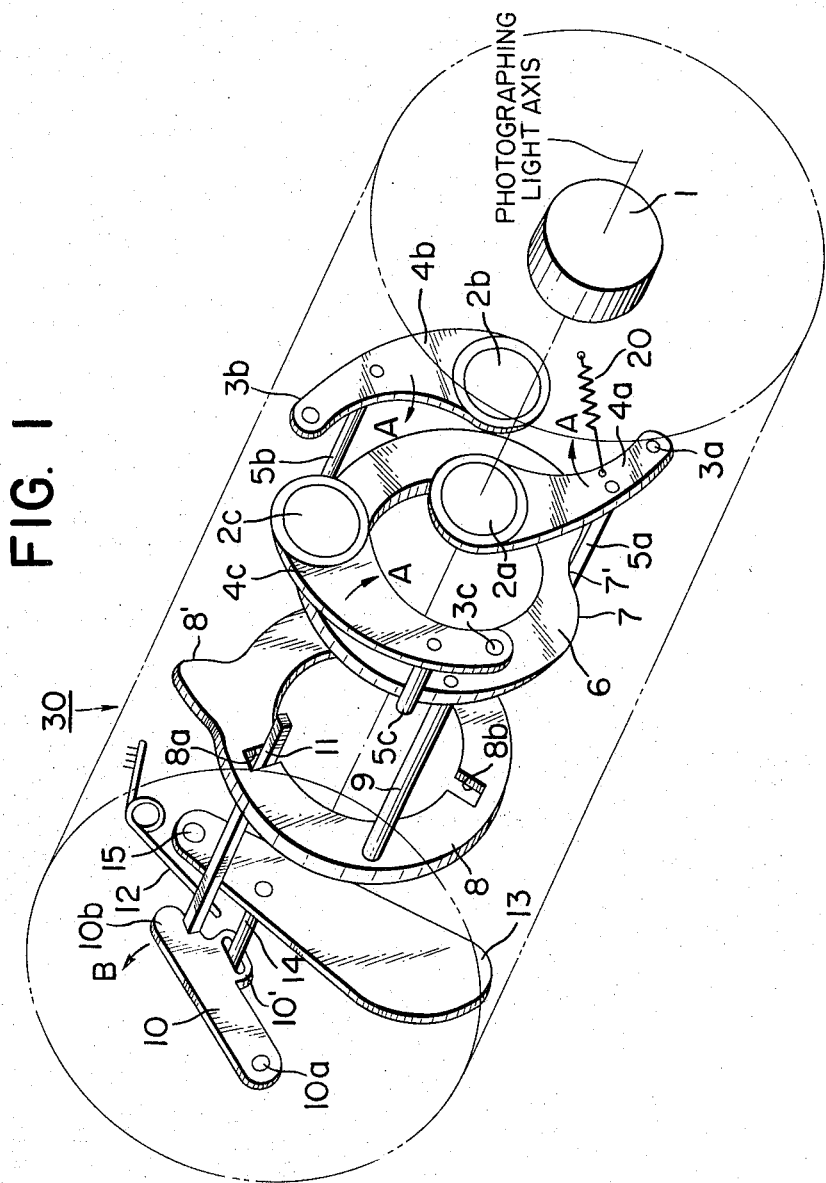
FIG. 1 is a perspective view showing the filter change-over device with one of the filters positioned in predetermined position in the optical path.

Referring to FIG. 1, an objective lens 1 is secured within a body tube 30, which also houses therein a plurality of filters. While any desired number of filters may be used, FIG. 1 shows an arrangement of three filters 2a, 2b and 2c, one of which 2a is shown located on the optical axis of the lens 1. The filters 2a, 2b and 2c are securely supported by filter means or holder arms 4a, 4b and 4c respectively, which are rotatable about pivot pins 3a, 3b and 3c fixed to the inner wall of the body tube 30. The filter holder arms or members 4a, 4b and 4c are each biased in the direction of the arrows A, or toward the optical axis by springs 20 connected between the holder arms and the body tube. For clarity in illustration one such spring 20 for the arm 4a is shown.

As also shown in FIG. 1, the filter holder arms have pins 5a, 5b and 5c respectively secured thereto. The pins extend axially or parallel to the optical axis. A filter change-over cam plate 6 is mounted rotatably in a conventional manner. The cam plate 6 has a peripheral camming surface 7 which is recessed at 7' with respect to the rest of the cam plate's outer periphery. The pins 5a, 5b and 5c of the filter holder arms are in engagement with the camming surface. A filter change-over ring member 8 is rotatably mounted on the body in a well known manner. The change-over ring is cooperatively related to the cam plate 6, and has notches 8a, 8b and 8c (the notch 8c is not shown) formed in the inner periphery thereof at locations which correspond to the proper positions of the filters on the optical axis, the number of such notches corresponding to the number of the filters contained in the body tube. An axially extending shaft 9 secured at one end to the cam plate 6 and at the other end to the filter change-over ring 8 interconnects the cam plate 6 and the ring 8. A manually engageable member 8' extends out of the tube 30 to permit the ring to be rotated during change-over operation. The cam plate 6 and the change-over ring 8 are rotatable about the optical axis of the objective lens 1.

A filter change-over lever 10 is pivoted at one end by a pin 10a secured to the body tube 30, and has the other end 10b thereof projected out of the body tube. The filter change-over lever has a slot 10' formed in the lower portion thereof, and further has an enlongated projection 11 which may be received in the notches 8a and 8b formed in the filter change-over ring 8. The projection 11 extends parallel to the optical axis and is biased in the direction of arrow B by a spring 12.

The aforesaid members or elements 3, 4, 5, 6, 7, 8, 9, 10, 11, 12, and 20 together constitute filter change-over means for the filters 2.

A light-intercepting plate 13 is interposed between the filter change-over ring 8 and the filter change-over lever 10. A transmission pin 14 is secured to the light-intercepting plate, and the pin is received in the slot 10' of the filter change-over lever 10. Thus, the plate 13 is rotated about a pivot pin 15, which is secured to the body tube, in response to the movement of the filter change-over lever 10, whereby the plate enters the light beam passing along optical path or axis to intercept it.

The members or elements 10, 13, 14 and 15 together constitute light intercepting means.

For the change-over from the position in which the filter 2a is aligned with the optical axis (FIG. 1) to the position in which another filter 2c is aligned with the optical axis, the filter change-over lever 10 which is in the keyed position wherein notch 8a of the filter change-over ring 8 receives projection 11, is first manually depressed in the direction of arrow C (i.e. in the direction toward the optical axis) as shown in FIG. 2. This movement of the lever causes the projection 11 to move out of the notch 8a of the filter change-over ring 8 against the force of the spring 12, and to permit rotation of the filter change-over ring by the manually engageable means or member 8'. Rotation of the ring 8 causes the projection 11 to be engaged by the inner periphery of the filter change-over ring, thus maintaining the filter change-over lever 10 in its depressed or unkeyed position. With the filter change-over lever 10 so depressed, the light intercepting member 13 is rotated counter-clockwise by the transmission pin 14 engaged in the slot 10'. As shown in FIG. 2, the light intercepting member 13 thus enters the optical path and stops at the position for intercepting the light beam.

On the other hand, clockwise rotation of the filter change-over ring 8 causes rotation of the cam plate 6 through the shaft 9. Thus, the pin 5a which is in engagement with a portion of the camming surface 7 is raised against the biasing force of the associated spring 20 to cause the filter holder arm 4a to be rotated in the direction away from the optical axis. Further rotation of the filter change-over ring 8 brings the pin 5c of the filter holder arm 4c for the filter 2c into engagement with the camming surface 7. The pin 5c is moved down along the camming surface 7 by the force of a spring (not shown) so that the filter holder arm 4c begins to rotate toward the optical axis. When the filter 2c is positioned in place on the optical axis at the end of the filter change-over process, the next one of the notches 8b in the filter change-over ring 8 comes round to the position of the projection 11. When the projection 11 is received in the notch 8b with the aid of the force of the spring 20, the filter change-over lever 10 returns to its initial position in response to the movement of the projection 11. At the same time, the light intercepting plate 12 is rotated clockwise by means of the transmission pin 14 associated with the slot 10' of the lever 10, and thereby retracted away from the optical axis, thus completing the filter change-over.

When it is desired to use the objective lens 1 with no filter in combination therewith, one of the filters 2a, 2b and 2c may be replaced by a colorless transparent glass plate.

Thus, according to the present invention, the light beam may be intercepted by the light intercepting plate during the period the filter change-over is taking place within the body tube of a single lens reflex camera having filters contained therein. Therefore, whenever the photographer attempts to take a picture before the filter change-over is completed, he will find the interior of the viewfinder pitch-black and thus he will know that the filter change-over has not completely been effected as yet. In this way, the photographer can be distinctly warned of the incomplete filter change-over and avoid any erroneous photography which would otherwise occur.

I claim:

1. A filter change-over device in a tube for an objective lens, the device comprising a plurality of filter members adapted to be positioned in the optical path of the objective lens; filter change-over means for moving the filter members individually to a predetermined position in the optical path; a light intercepting member for intercepting the optical path when any one of the filter members is being moved to said predetermined position; and means responsive to the filter change-over means for removing the light intercepting member from the optical path when any one of the filter members is in said predetermined position.

2. A filter change-over device in a tube for an objective lens, the device comprising a plurality of filter members each movable separately between a first position lying in the optical path of the objective lens and a second position lying outside the optical path; a light intercepting member movable between a first position for intercepting the optical path and a second position outside the optical path; and means connecting the filter members and the light intercepting member so that the light intercepting member is in its said second position when any one of the filter members is in its first position, the light intercepting member being in its said first position when none of the filter members are in their first position.

3. A filter change-over device according to claim 2, wherein the filter members each comprise a pivoted holder arm; and wherein the means connecting the filter holder arms and the light intercepting member comprises a pin extending respectively from each arm, a cam plate, the pins being positionable by the cam plate, a ring member having spaced notches formed in the periphery thereof, means connecting the cam plate and the ring member, a manually operable pivoted lever having an axially extending projection receivable in said notches, and means for positioning the light intercepting member in accordance with the position of the lever.

4. A filter change-over device for a single lens reflex camera including an objective lens, the device comprising a tube having therein a plurality of filter means each of which is separately movable between a first position in the optical path of the lens and a second position outside the optical path; a first manually operable means operatively associated with each of the filter means and movable to selectively bring one of the filter means into said first position; a second manually operable means cooperable with the first manually operable means and movable between a keyed position and an unkeyed position, the first manually operable means being immovable in the keyed position of the second manually operable means and being freely movable in the unkeyed position of the second manually operable means; and light intercepting means operatively associated with said second manually operable means so that said intercepting means is positioned in the optical path when the second manually operable means is in unkeyed position; the light intercepting means being retracted from the optical path when the second manually operable means is in keyed position.

5. A filter change-over device according to claim 4, wherein the first manually operable means comprises a ring member having spaced notches formed in the periphery thereof, a cam plate connected to the ring member, the filter means being positionable by the cam plate; and wherein the second manually operable means comprises a pivoted lever having a projection receivable in said notches, and means for positioning the light intercepting means in accordance with the position of the lever.

6. A filter change-over device according to claim 5, wherein the filter means each comprise a pivoted holder arm; wherein a pin extends axially from each arm in engagement with the cam plate, the cam plate and the ring member being rotatable about the optical axis; wherein the holder arms are normally resiliently biased toward the optical axis; wherein the notches are formed in the inner periphery of the ring member; and wherein the projection extending from the lever is biased to resiliently maintain it against the inner periphery of the ring.

* * * * *